Oct. 13, 1964 W. L. REHDE 3,152,660
APPARATUS FOR REVERBERATING SOUNDS
Filed Oct. 17, 1961 8 Sheets-Sheet 1
Fig: 1
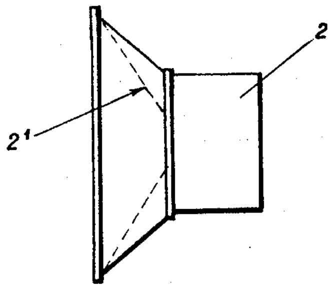
Fig: 2
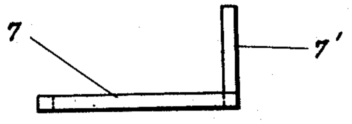
Fig: 2a
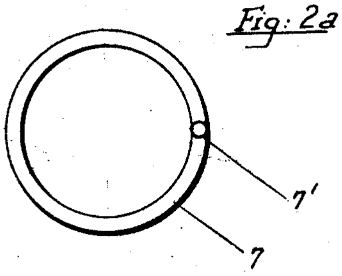
Fig: 4 Fig: 5
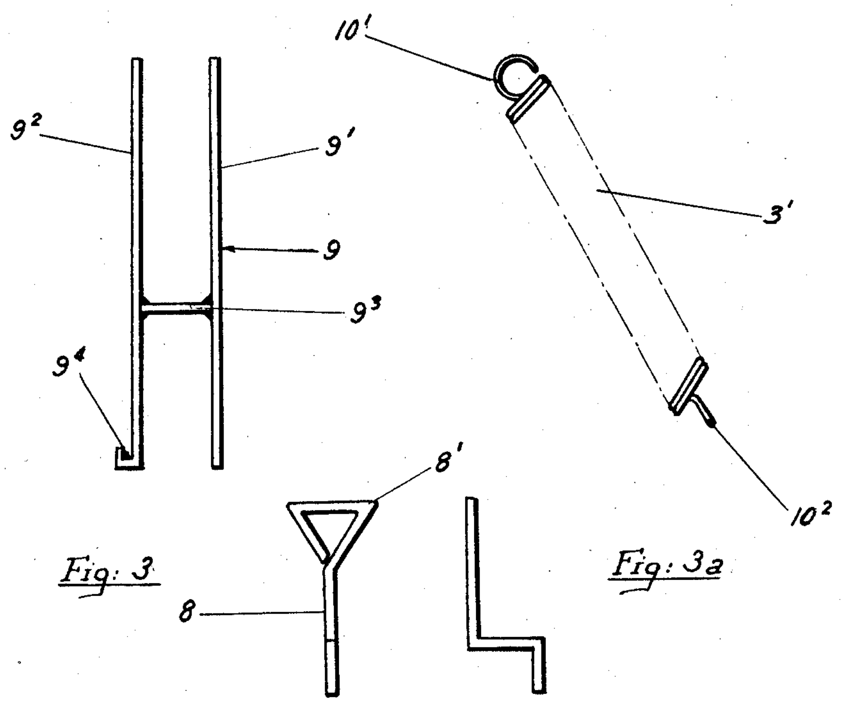
Fig: 3 Fig: 3a

APPARATUS FOR REVERBERATING SOUNDS

Filed Oct. 17, 1961 8 Sheets-Sheet 2

APPARATUS FOR REVERBERATING SOUNDS

Fig: 10
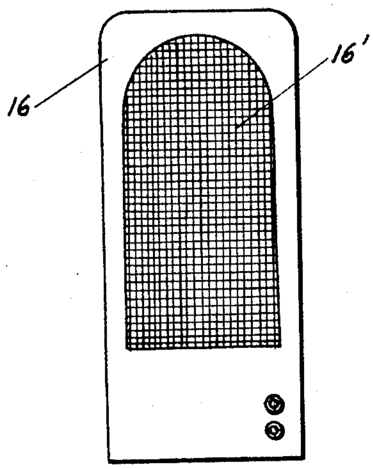
Fig: 10a
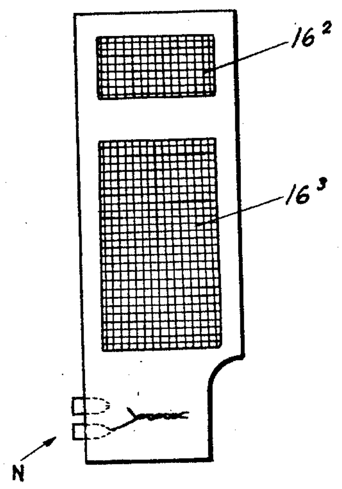
Fig: 11
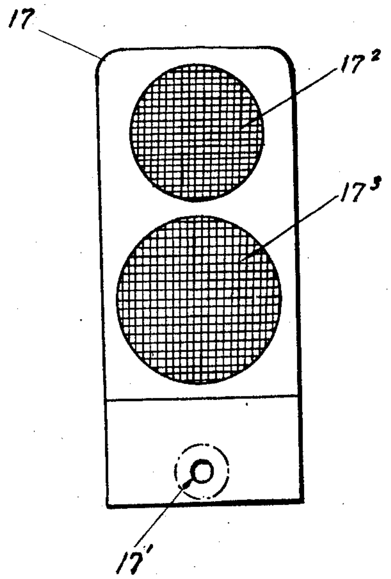
Fig: 11a
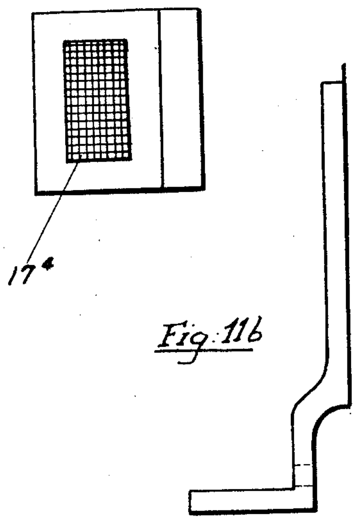
Fig: 11b Oct. 13, 1964 W. L. REHDE 3,152,660

APPARATUS FOR REVERBERATING SOUNDS

Filed Oct. 17, 1961 8 Sheets-Sheet 6

Oct. 13, 1964 W. L. REHDE 3,152,660

APPARATUS FOR REVERBERATING SOUNDS

Filed Oct. 17, 1961 8 Sheets-Sheet 7

United States Patent Office 3,152,660

Patented Oct. 13, 1964

3,152,660
APPARATUS FOR REVERBERATING SOUNDS

Weber Louis Rehde, Bavans (Doubs), France

Filed Oct. 17, 1961, Ser. No. 145,666
Claims priority, application France, Nov. 30, 1960, 1,429, Patent 1,290,146; Aug. 3, 1961, 869,962, Patent 80,185
11 Claims. (Cl. 181—31)

The present invention has the purpose of producing a microphone enabling sound vibrations converted into mechanical vibrations to be maintained in a decreasing manner.

Another purpose of the invention is to produce, in a simple manner, an artificial sound reverberation, whatever the sound equipped hall may be.

Another purpose of the invention is to produce a reverberating microphone of particularly strong structure.

Other purposes and advantages of the invention will be revealed in the following description and the attached drawings, in which:

FIGURE 1 is a side view of a microphone.

FIGURE 2 is a side view of the resonance ring attached to the movable diaphragm of the microphone.

FIGURE 2*a* is a front view of the resonance ring.

FIGURE 3 is a front view of the rod connected to the resonance ring.

FIGURE 3*a* is a side view of the rod.

FIGURE 4 is a side view of the rod assembly holding the various springs together.

FIGURE 5 is a side view of a spring used for maining mechanical vibrations.

Figure 6:
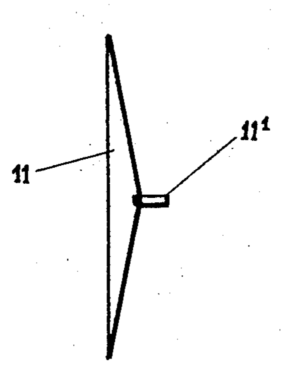

FIGURE 6 is a side view of the diaphragm connected to the springs, picking up sound vibrations.

Figure 6A:
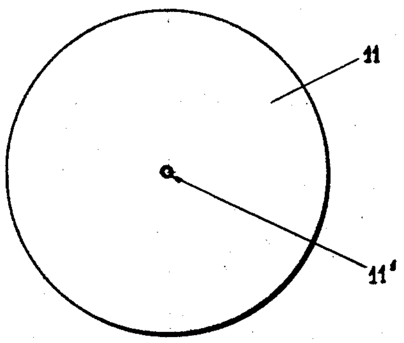

FIGURE 6*a* is a rear view of the diaphragm.

Figure 7:
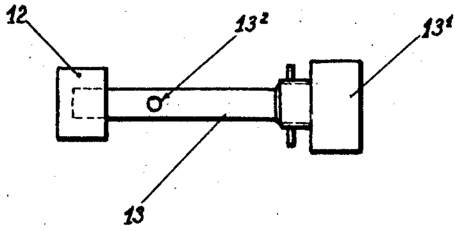

FIGURE 7 is a side view of the controlling device for regulating the reverberation degree of the sounds.

Figure 8:
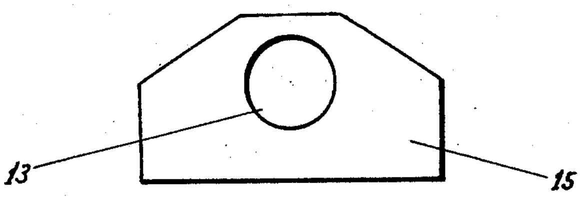

FIGURE 8 is a front view of the support-plate of the knob for controlling the reverberation degree of the sounds.

Figure 9:
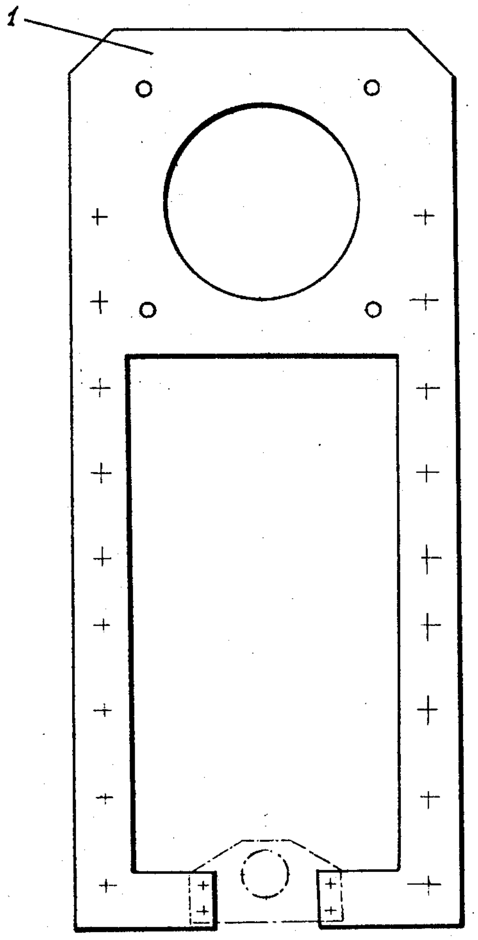

FIGURE 9 is a front view of the support-plate of the microphone and springs.

Figure 9A:
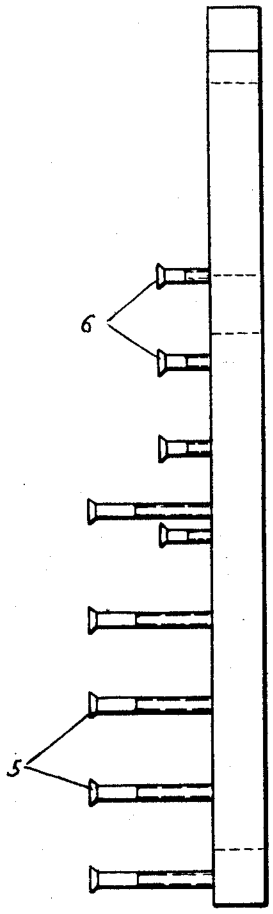

FIGURE 9*a* is a side view of the support-plate, showing the rods supporting the springs which are attached to the right-hand side of the support-plate of FIGURE 9.

Figure 9B:
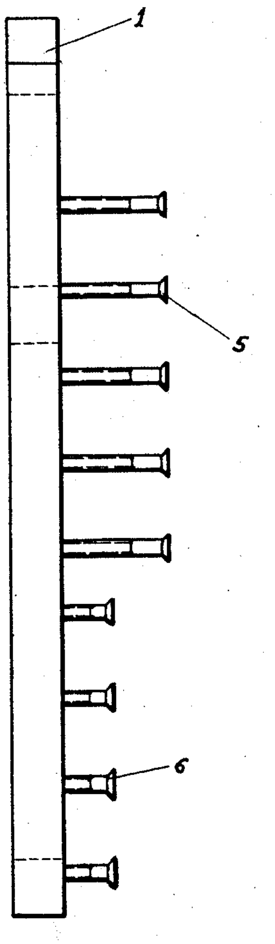

FIGURE 9*b* is a side view of the support-plate, showing the rods supporting the springs which are attached to the left-hand side of the support-plate of FIGURE 9.

FIGURE 10 is a front view of the casing of a reverberating microphone.

FIGURE 10*a* is a right-hand view of FIGURE 10.

FIGURE 11 shows a rear view of the removable cover mounted on the back of the casing of FIGURES 10 and 10*a*.

FIGURE 11*a* is a view seen from below the cover of FIGURE 11.

FIGURE 11*b* is a side view of the cover.

Figure 12A:
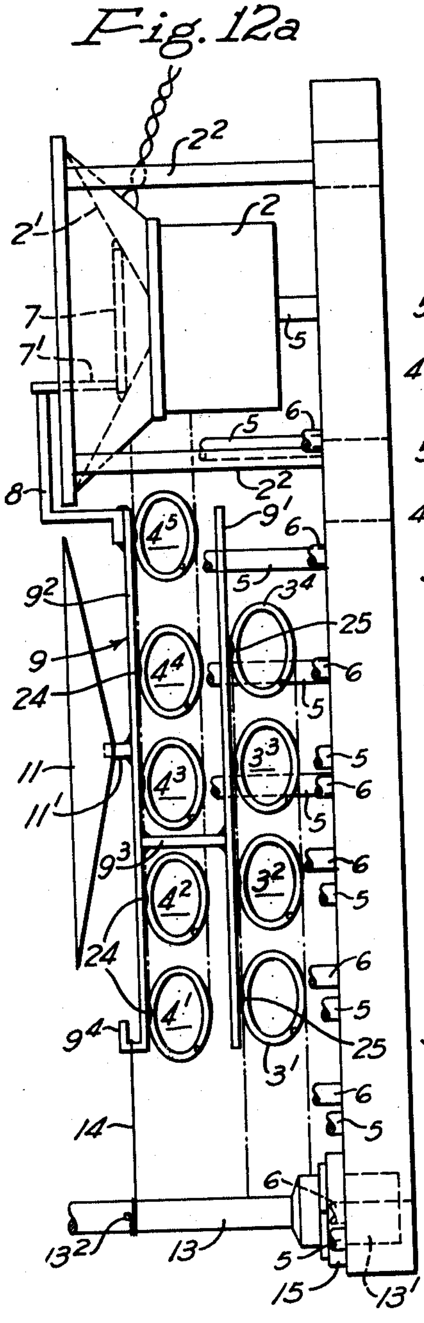
Figure 12:
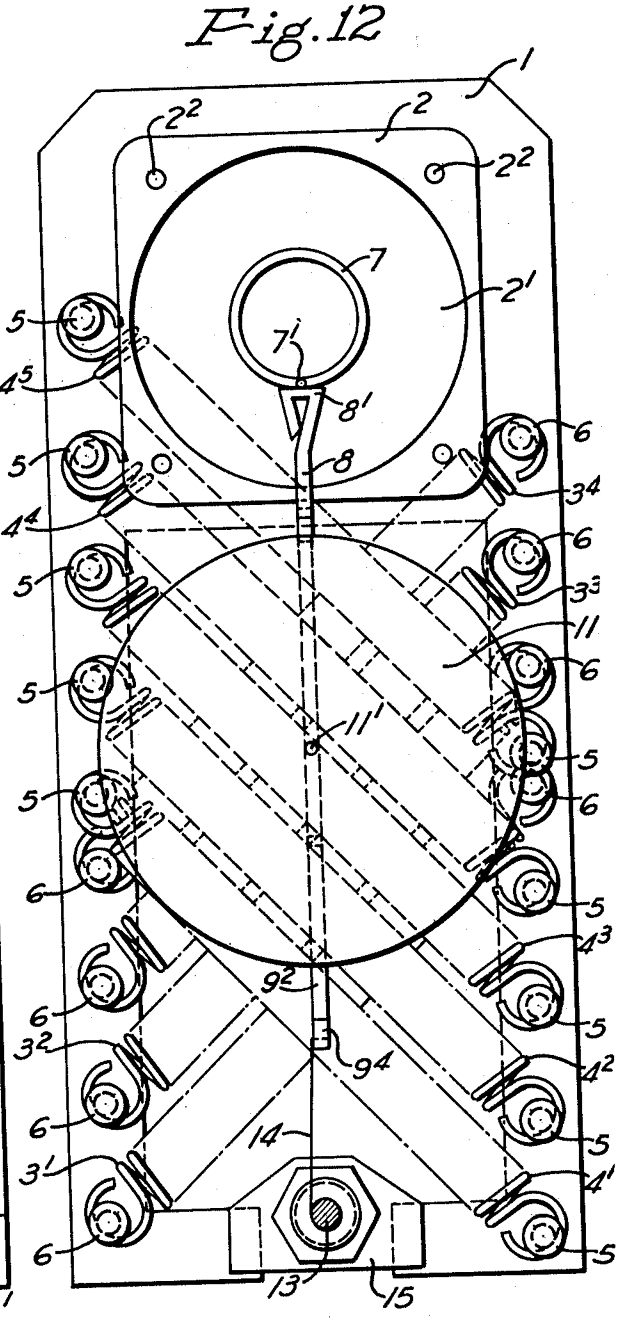

FIGURE 12 shows a front view of the mechanism of the reverberating microphone.

FIGURE 12*a* is a right-hand view of FIGURE 12, but with the spring-supporting rods broken off and the springs broken away at their centers for clearness.

Figure 13:
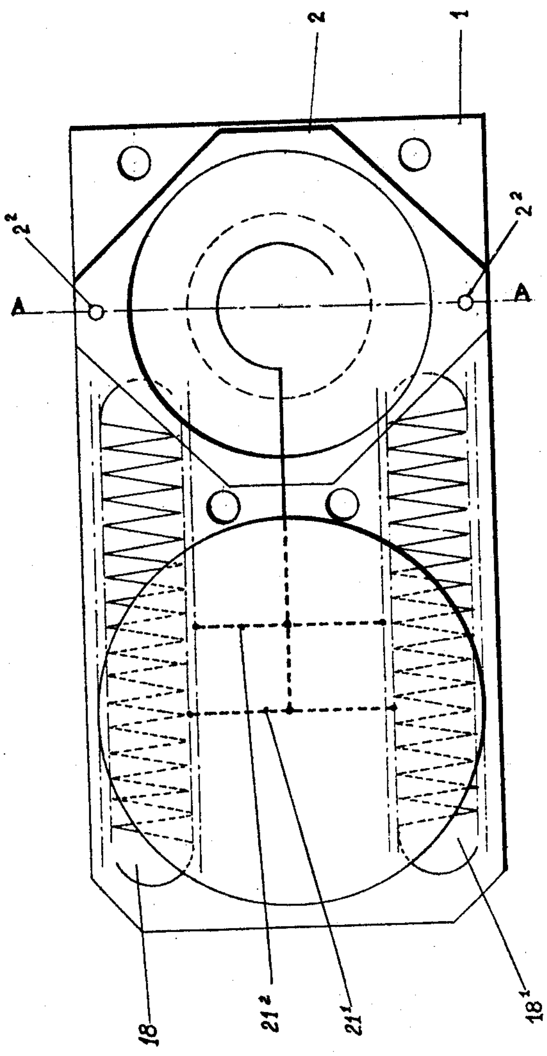

FIGURE 13 shows a view from the front of another form of embodiment of the reverberating microphone.

Figure 14:
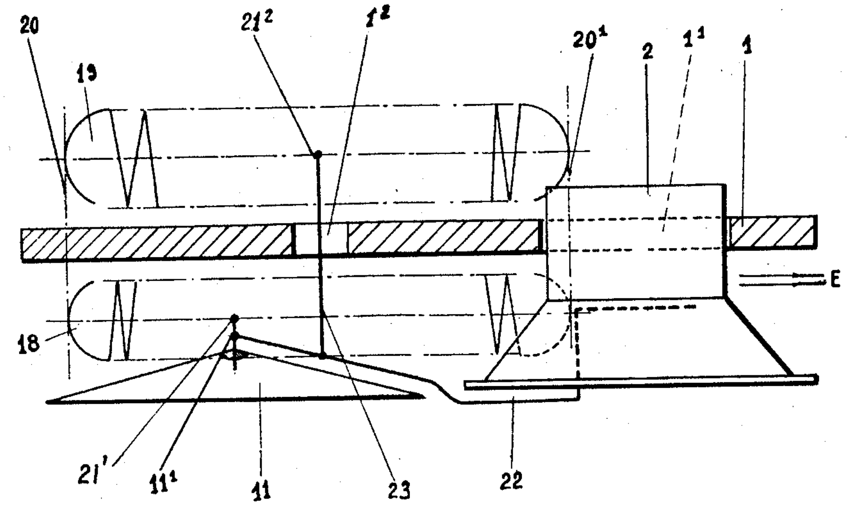

FIGURE 14 shows in diagrammatical longitudinal section the reverberating microphone of FIGURE 13.

Figure 15:
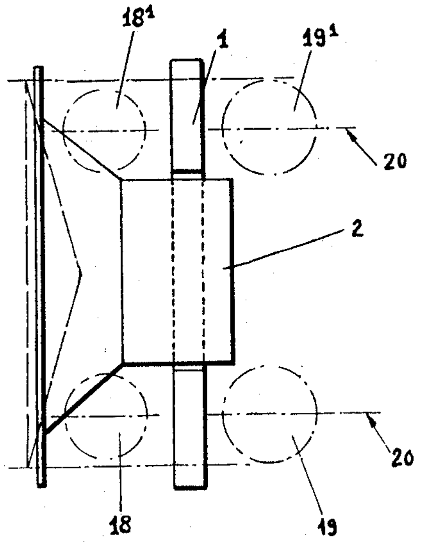

FIGURE 15 is a section taken along A—A of FIGURE 13.

The reverberating microphone shown in FIGURES 1 to 12 and 12*a* consists of a support-plate 1 on to which the dynamic microphone 2 is fixed (see FIGURE 12) as well as the springs $3_1$, $3_2$, $3_3$, $3_4$, $4_1$, $4_2$, $4_3$, $4_4$, $4_5$.

This microphone 2, possessing a movable diaphragm $2_1$ is fixed on the support-plate by means of rods $2_2$ passing through opening made in this microphone.

The springs $3_1$ to $3_4$ and $4_1$ to $4_5$ can be arranged parallel or form an angle in relation to each other.

In the example of embodiment of FIGURES 1 to 12 the springs $3_1$ to $3_4$ form an angle with the springs $4_1$ to $4_5$, which is the preferred arrangement.

These springs are fixed on the support-plate by means of rods 5 and 6. These rods 5 and 6 have two lengths, the rods 5 being longer than the rods 6 and enable the springs $4_1$ to $4_5$ on the one hand, and $3_1$ to $3_4$ on the other, to be fixed in two stages.

On the movable diaphragm $2_1$ of the microphone 2 a resonance ring 7 is fixed having a part $7_1$ bent in a right angle, in relation to the plane of the resonance ring 7 (see FIGURES 12 and 12*a*).

This resonance ring 7 is fixed by soldering or any other means to the movable diaphragm $2_1$ of the dynamic microphone. A rod 8 (see FIGURES 3 and 3*a*) having a triangular part $8_1$ at one of its ends, is fixed to the part $7_1$ of the resonance ring 7, in order to establish the mechanical liaison between this resonance ring 7 and the element 9 connected to the springs.

This element 9 (see FIGURE 4) consists of two parallel rods ($9_1$ and $9_2$) joined by a rod $9_3$ fixed by soldering. A hook $9_4$ is formed at one of the ends of the rod $9_2$ which acts for fixing the wire for regulating the degree of sound reverberation.

The rod $9_1$ of the element 9 is connected, such as by solder 25 or the like, to the central parts of a series of parallel springs $3_1$, $3_2$, $3_3$, $3_4$, whereas the branch $9_2$ is connected in the same manner (solder 24) to the central parts of the other series of parallel springs $4_1$, $4_2$, $4_3$, $4_4$, $4_5$, it being understood that these two series of springs form an angle between them.

These springs are, for example, spiral springs (see FIGURE 5) and comprise hooks $10_1$, $10_2$ at their ends for hooking them on to the rods 5 or 6.

On the rod $9_2$ of the element 9 there is also a movable diaphragm 11 fixed (see FIGURES 6 and 6*a*), which is intended to pick up sound vibrations and convert these sound vibrations into mechanical vibrations.

The fixing of this diaphragm 11 on to the rod $9_2$ of the element 9 takes place by a connecting rod $11_1$ which is fixed by soldering or any other means, on the one hand, to the center of the diaphragm 11, and on the other, on the rod $9_2$.

By reason of this mounting of the movable diaphragm 11, it is suspended by the various springs through the intermediary of the rods $9_1$ and $9_2$ and the connecting rod $11_1$ (see FIGURES 12 and 12*a*).

The regulation of the degree of reverberation of sounds is obtained through a knob 12 mounted at the end of a spindle 13. This spindle 13 can, for example, be formed by the control rod of a potentiometer $13_1$. There is a hole $13_2$ in this spindle 13 into which a wire or cable 14 is fixed.

The free end of this wire 14 is fixed on the hook $9_4$ of the rod $9_2$, which enables, by turning the knob 12, the winding of the wire 14 on the spindle 13 and thus more or less stretch the wire or cable 14.

The pull of the wire 14 is transmitted to the springs $3_1$ to $3_4$ and $4_1$ to $4_5$ through the element 9, consequently enabling the pull and also the elasticity of the springs to be varied. The pull on rods $9_1$ and $9_2$ is slight. The pull on the diaphragm is equally weak and, besides, is in a transverse direction so that there is practically no reaction on the microphone. The only real effect is on the springs, the mechanical vibrations of which are thereby limited or attenuated, especially when those vibrations attain a certain amplitude. By this device, it is thus possible to modify the degree of reverberation of sounds or sound echoes produced by this microphone.

The potentiometer $13_1$ is fixed on the support-plate 1 by means of a small plate 15 fixed on the support-plate 1 by screws or other means.

The mechanism of the reverberating microphone, shown in FIGURES 12 and 12*a* is placed in a casing 16, whose walls are provided with openings $16_1$, $16_2$ and $16_3$ masked by canvas, which enables the user to attack the diaphragm 11 and the movable diaphragm $2_1$ of the microphone by speaking in front of these canvases $16_1$, $16_2$, and $16_3$. The rear face 17 of this casing 16 is removable and is fixed on the casing 16 by means of a screw housed in an aperture $17_1$ in the removable cover 17. On this cover 17 there are also several openings $17_2$, $17_3$, $17_4$, for the free passage of sound vibrations.

This device thus enables the maintaining, in a decreasing manner, of sound vibrations which are converted into mechanical vibrations by the diaphragm 11 and conveyed by the connecting rods $9_2$, 8 and 7, to the dynamic microphone 2, which converts the mechanical vibrations into alternating current. Actually, when the user speaks in front of the casing of the reverberating microphone, the sound vibrations are picked up by the diaphragm 11 and the movable diaphragm $2_1$ of the microphone 2. In this manner, the mechanical vibrations of the diaphragm 11 maintain the mechanical vibrations of the diaphragm $2_1$ of the microphone.

The reverberating microphone shown in FIGURE 13 also consists of a plate of wood or similar material on which the various elements are placed forming this reverberating microphone.

There is an aperture $1_1$ in this plate inside which the rear part of the dynamic microphone 2 is housed. This dynamic microphone 2 is also fixed to the small plate 1 by means of screws (not shown) placed at $2_2$.

Four springs 18, $18_1$, 19, $19_1$ are fixed to this plate 1 by means of rods diagrammatized at 20, which pass through the small plate 1. In this way, each rod 4 can maintain one of the springs at its two ends.

This reverberating microphone thus uses four springs which are placed parallel to one another.

Two of these springs 18 and $18_1$ are placed on the upper face of the plate 1, the two others, 19 and $19_1$ are placed on the lower face.

The two springs 18 and $18_1$ placed on the upper face of the plate 1 are connected to each other by a metal rod $21_1$.

Likewise, the two springs 19 and $19_1$ placed on the lower face of the plate 1 are connected to each other by a metal rod $21_2$.

The rods $21_1$ and $21_2$ connecting the springs are fixed on these springs by soldering or any other means.

The varnished cardboard diaphragm 11 is placed near to the microphone 2. This diaphragm 11 comprises an attachment cap or a metal rod $11_1$ which connects this diaphragm 11 to the rod $21_1$ connecting the two springs 18 and $18_1$. This rod $11_1$ is also connected to the movable diaphragm 2 of the microphone by means of a rod 22 which terminates at the side of the microphone by a resonance ring fixed by soldering to said diaphragm. On this rod 22 connecting the diaphragm 11 to the microphone 2 there is also a rod 23 fixed holding the rods $21_1$ and $21_2$ together integral with the springs placed on each of the faces of the plate 1. This rod 23 passes through an aperture $1_2$ in the support-plate 1. In this way, the four springs, 18, $18_1$, 19 and $19_1$ vibrate simultaneously, transmitting these vibrations to the diaphragm of the microphone 2.

This microphone operates in the following manner:

When the user speaks in front of the microphone 2, the sounds also strike on the diaphragm 11, which transmits the mechanical vibrations coming from the sound to the springs 18, $18_1$, 19 and $19_1$. In their turn, these springs begin to vibrate, as they are connected to the diaphragm of the microphone by means of the rods 22 and 23, these vibrations being also transmitted to the microphone, so as to produce the reverberating or echo effect sought.

The initial sounds are thus maintained during a certain time and in a decreasing manner; however, the degree of reverberation of the sounds will be determined according to the characteristics of the springs, the pull of the latter between their attachment points, and also according to the characteristics of the diaphragm 11 which picks up the sounds.

This reverberating microphone is quite easy to make, enabling an artificial reverberation to be obtained, no matter what kind of sound installation may be in a hall, it being only necessary to connect up any kind of amplifier to the output of the microphone 2 to obtain the power required.

What I claim is:

1. In reverberating apparatus, a microphone having a movable diaphragm, a support, springs fastened by their ends to the support, a second diaphragm for picking up sound vibrations, and means connecting both diaphragms with the middle points of the springs.

2. In reverberating apparatus according to claim 1, movable means carried by said support and operatively connected with said springs for regulating the degree of sound reverberation.

3. In reverberating apparatus, a microphone having a movable diaphragm, a support, springs fastened by their ends to the support, rods connecting the middle points of the springs, a second diaphragm for picking up sound vibrations, and means connecting both diaphragms with said rods.

4. In reverberating apparatus according to claim 3, a spindle rotatably mounted on said support, a wire connected to said rods and wound on said spindle, and a knob rigidly mounted on the spindle for turning it to regulate the degree of sound reverberation.

5. In reverberating apparatus, a microphone having a movable diaphragm, a support, springs fastened by their ends to the support, springs fastened by their ends to the support, rods connecting the middle points of the springs, a second diaphragm for picking up sound vibrations, said second diaphragm being connected to said rods, and a resonance ring mounted on said microphone diaphragm and connected with said rods.

6. In reverberating apparatus according to claim 5, said springs being arranged in two spaced stages, one of said rods being connected to the springs in one of said stages, and another of said rods being connected to the springs in the other stage.

7. In reverberating apparatus according to claim 6, said stages being parallel.

8. In reverberating apparatus, a microphone adapted to be connected to an amplifier and having a diaphragm exposed to vibration by sound waves, a support adjacent the microphone, spring means having ends connected to said support, a substantially stiff member fastened to the central portions of the spring means and to said diaphragm, and a second diaphragm carried by said stiff member and exposed to vibration by said sound waves so as to vibrate said member and spring means, whereby said microphone diaphragm is vibrated by said stiff member also.

9. In reverberating apparatus according to claim 8, adjustable means flexibly connected with said stiff member for damping the vibrations thereof.

10. In reverberating apparatus, a microphone adapted to be connected to an amplifier and having a diaphragm exposed to vibration by sound waves, a support adjacent the microphone, a plurality of springs spaced from said support and having ends, means connecting said spring ends to the support, a resonance ring fastened to said diaphragm, rod means rigidly connected to said ring and extending away from the microphone, means fastening the central portions of the springs to said rod means, and a second diaphragm carried by said rod means and exposed to vibration by said sound waves so as to vibrate said rod means and springs, whereby said microphone diaphragm is vibrated by said ring also.

11. In reverberating apparatus according to claim 10, a wire connected to said rod means remote from the microphone, and means connected with said support and wire for varying the tension on the wire to regulate the degree of vibration of the rod means and springs.

References Cited in the file of this patent

UNITED STATES PATENTS

| | | |
|---|---|---|
| 2,375,004 | Knowles | May 1, 1945 |
| 2,768,235 | Knoblaugh | Oct. 23, 1956 |
| 2,853,145 | Martin | Sept. 23, 1958 |
| 2,900,453 | Cammock | Aug. 18, 1959 |
| 2,982,819 | Meinema | May 2, 1961 |
| 3,004,620 | Baschet | Oct. 17, 1961 |